United States Patent [19]

Senuma et al.

[11] 4,320,950
[45] Mar. 23, 1982

[54] ELECTROMAGNETICALLY DRIVEN SHUTTER

[75] Inventors: Michio Senuma, Tokyo; Yoji Sugiura, Yokohama; Fumio Shimada, Kawasaki, all of Japan

[73] Assignees: Canon Kabushiki Kaisha; Canon Denshi Kabushiki Kaisha, both of Tokyo, Japan

[21] Appl. No.: 207,980

[22] Filed: Nov. 18, 1980

[30] Foreign Application Priority Data

Nov. 20, 1979 [JP] Japan .................................. 54-150241

[51] Int. Cl.³ ............................ G03B 9/08; G03B 9/40
[52] U.S. Cl. ....................................... 354/235; 354/246
[58] Field of Search ............... 354/247, 248, 249, 250, 354/245, 246, 234, 235, 50

[56] References Cited

U.S. PATENT DOCUMENTS

| 3,217,624 | 11/1965 | Webb | 354/235 |
| 3,466,993 | 9/1969 | Fahlenberg et al. | 354/235 |
| 3,922,698 | 11/1975 | Petersen | 354/235 |
| 4,001,844 | 1/1977 | McClintock | 354/235 X |
| 4,220,409 | 9/1980 | Inoue | 354/249 X |

Primary Examiner—Donald A. Griffin
Attorney, Agent, or Firm—Toren, McGeady & Stanger

[57] ABSTRACT

In the shutter disclosed, a conductor and a permanent magnet, movable relative to each other, form a driver to drive at least one shutter blade across an optical path for photographic light and the force of the driver is supplemented by an auxiliary spring arrangement that exerts zero force at the start of movement of the shutter blade and gradually increases toward termination of movement of the blade.

7 Claims, 9 Drawing Figures

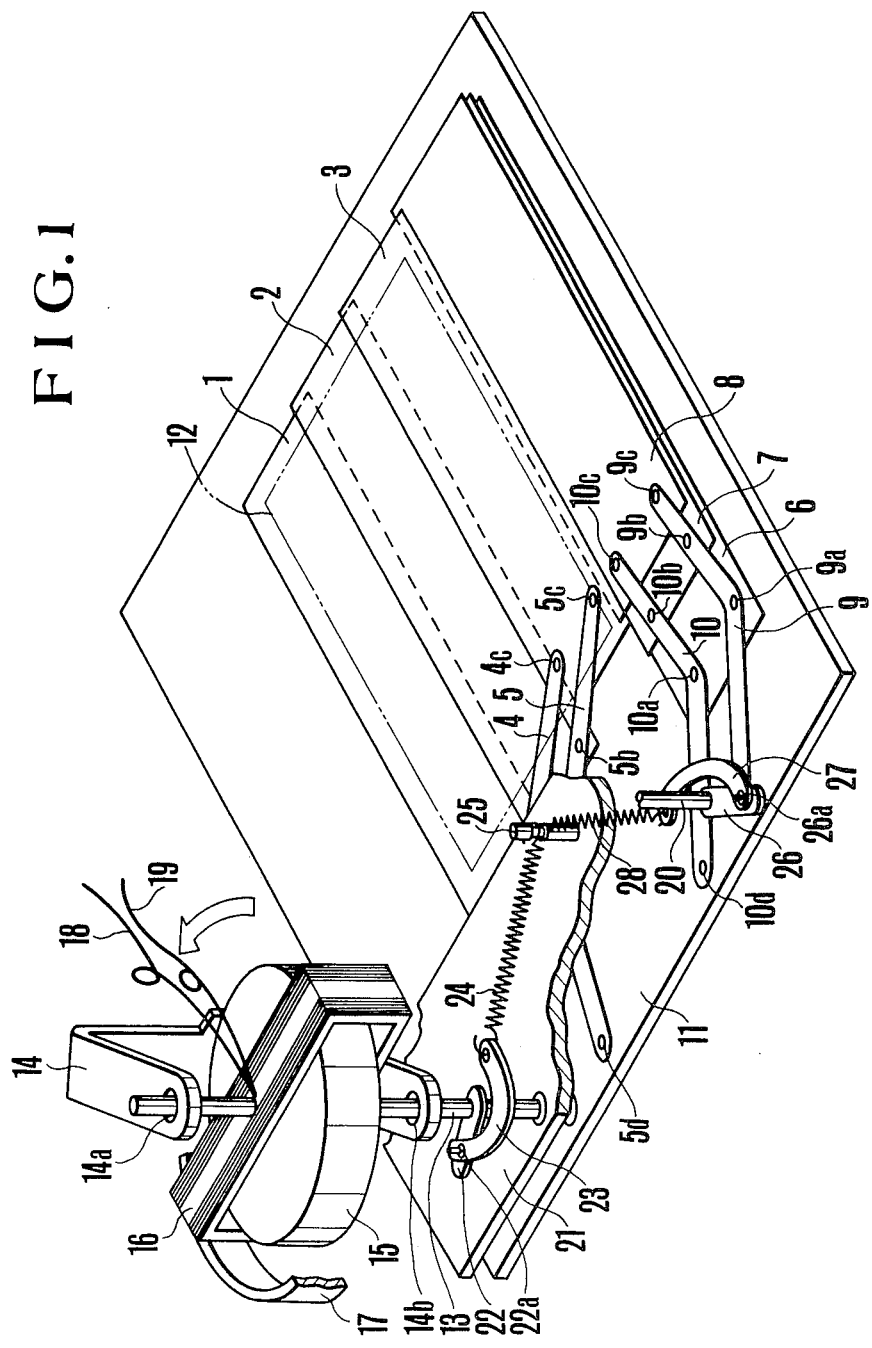

ELECTROMAGNETICALLY DRIVEN SHUTTER

BACKGROUND OF THE INVENTION

1. Field of the Invention

This invention relates to an electromagnetically driven camera shutter, particularly focal plane shutters, and involves an auxiliary spring to compensate for insufficiencies in the drive force exerted by the electromagnetic portions of the shutter drive device.

2. Description of the Prior Art

Increased use of electronic controls in cameras has resulted in various proposals for electromagnetic drive devices to drive shutter blades across a shutter's optical path. Because such electromagnetic drive devices must be small enough to be incorporated into compact cameras, it is difficult to utilize mechanisms sufficiently powerful to perform the desired functions. The energy available for consumption also limits this driving force. Thus, it is often necessary to try to utilize lighter shutter blades, avoid friction between drive members, etc. so as to drive mechanisms such as focal plane shutters. For compact electromagnetic drive sources utilizing internal magnetic type drive devices, it is necessary that the permanent magnet be compact and powerful. Anisotropic rare earth magnets have been proposed for this purpose. However, the outputs of such magnets are still insufficient for compact drives. This is especially so because it is difficult to distribute the flux evenly with rare earth magnets. This makes it impossible to furnish an electromagnetic drive force which is even over the entire displacement phase of the shutter blades. Hence, it is impossible to provide a large stroke to drive the shutter blades.

If the stroke is not sufficiently large, not only is it difficult to obtain a strong enough drive force, but the accuracy and reliability of the shutter blade control is decreased.

SUMMARY OF THE INVENTION

An object of the present invention is to offer an electromagnetically driven shutter free from the abovementioned shortcomings of the conventional electromagnetically driven shutter.

Another object of the present invention is to offer an electromagnetically driven shutter capable of controlling a large stroke in case a permanent magnet such as anisotropic rare earth magnet the distribution of whose magnetic flux is narrow despite of high efficiency is made use of.

Further another object of the present invention is to offer an electromagnetically driven shutter capable of obtaining a large stabilized driving power over a wide range in case anisotropic rare earth permanent magnet with high efficiency is used.

Further another object of the present invention is to offer an electromagnetically driven shutter with high shutter speed in case anisotropic rare earth permanent magnet is used.

In case of an embodiment of the present invention in order to compensate the shortage of the driving force of the electromagnetic driving device an auxiliary spring is used as the auxiliary driving source so as to work at the position at which the density of the magnetic flux of the electromagnetic driving source is low, so that a stabilized driving power can be obtained over a wide range of the displacement phase.

In another embodiment of the present invention, an output is obtained by means of the urging force of the auxiliary spring over a wide range of the displacement phase, whereby the auxiliary spring does not work at the beginning of the shutter running and starts to work along with the running of the shutter. Hereby, the electromagnetic force reaches the maximum value immediately after the start of the shutter blades, while at the side at which the electromagnetic force is weak the driving force is increased with the urging force of the auxiliary spring in such a manner that an even driving force can be obtained over a wide range of the stroke. In this way, the shutter speed is increased, the running characteristics improved and the running stabilized, while a compact driving source as well as a compact permanent magnet can be realized so as to decrease the manufacturing cost.

In a further embodiment of the present invention, at the position at which the shutter is charged the shutter blade does not move unless the electromagnetic driving source is exacted, while the auxiliary spring does not act at the starting position, so that it is not necessary to provide a lock means at the charge position. Hereby, the shutter is not electromagnetically but mechanically charged because the auxiliary spring is present, so that no electrical power is consumed for the charge operation, which serves to further the economy of the power source of the camera, whereby a long life of a battery with small capacity can be obtained, which also contributes much to the decrease of the cost.

BRIEF DESCRIPTION OF THE DRAWINGS

FIG. 1 shows an embodiment of the electromagnetically driven shutter in accordance with the present invention in perspective view.

DESCRIPTION OF THE PREFERRED EMBODIMENTS

Figure 2A:
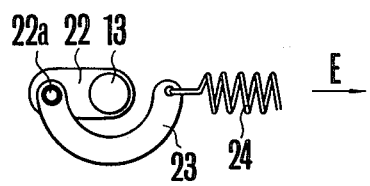
FIGS. 2(a), 2(b) and 2(c) are for explaining the operation of the auxiliary urging spring means to be used for the shutter shown in FIG. 1.

Below the present invention will be explained in accordance with the accompanying drawings.

FIG. 1 shows an embodiment of the electromagnetically driven shutter in accordance with the present invention in perspective view, whereby the shutter blades are driven by means of a meter type electromagnetic driving source so as to carry out the exposure and the return operation. In the drawing, the slit exposure shutter, particularly the focal plane shutter is utilized, whereby the driving source for the tail blades is omitted. Further, the drawing shows the charged state of the shutter, namely the shutter blades in ready state.

Although in the following embodiments the meter type electromagnetic driving source is made use of, for example as is disclosed in U.S. Pat. No. 3,654,845, it is possible to make use of the lens shutter construction and to arrange conductors on the sector ring. Naturally it is also possible to adopt a linear motor as the driving source.

Further, instead of providing the leading blades and the tail blades, it is also possible to adopt only one shutter blade provided with a slit exposure window with a predetermined width.

In the drawing, member is the shutter base plate having an exposure window 12. Members 4 and 5 are the shutter blade holding arms. One end 4d of the arm 4 is secured on the shutter driving shaft 13, which is rotatably linked on the shutter base plate 11.

The one end 5d of the arm 5 is rotatably linked on the shutter base plate 11. Members 1, 2 and 3 are the leading blades, being rotatably mounted on the leading blade holding arms 4 and 5 by means of the not shown pins 4a, 4b, 5a and 4c, 5b and 5c.

Elements 9 and 10 are the tail or trailing blade holding arms, whereby the one end 9d of the arm 9 is secured on the tail blade driving shaft 20, which is rotatably linked on the shutter base plate 11. The one end 10d of the arm 10 is rotatably linked on the shutter base plate 11. Elements 6, 7 and 8 are the tail or trailing blades, being rotatably mounted on the tail blade holding arms 9 and 10 by means of the pins 9a, 9b, 9c, 10a, 10b and 10c. Member 14 is the frame of the meter type driving part, in which a cylindrical permanent magnet 15 diametrically magnetized is fixed and which is fixed on the shutter base plate 11 or the fixing member in the camera. Member 16 is the leading blade driving coil as the movable conductor member, whereby a coil is provided on a bobin.

The leading blade driving coil 16 is fixed on the leading blade driving shaft 13.

The leading blade driving shaft 13 is held by means of the holding holes 14a and 14b formed in the frame 14, so as to be rotatable with reference to the fixed frame 1 and the permanent magnet 15. Member 17 is the yoke secured on the frame 14, positioned a slight distance from the permanent magnet 15 that the leading blade driving coil 16 is rotatable with reference to the permanent magnet 15 and secured to the frame 14 so as to constitute the magnetic circuit for the permanent magnet 15. Members 18 and 19 are the conductors for supplying current to the leading blade driving coil 16.

Member 21 is the cover plate, parallel to the shutter base plate 11 and positioned a slight distance from the shutter base plate 11 so that the leading blades 1, 2 and 3 and the tail blades 6, 7 and 8 are movable with reference to the shutter base plate 11. The cover plate 11 presents an exposure window corresponding to the exposure window 12, whereby in the drawing only a part thereof is shown for the sake of easy comprehension. Further, in the cover plate 21 the holes for the leading blade driving shaft 13 and the tail blade driving shaft 14 are provided. Member 22 is the leading blade driving arm, being secured on the leading blade driving shaft 13. Member 22a is the leading blade driving arm connecting pin, being secured on the leading blade driving arm 22. Member 23 is the leading blade connecting arm, being rotatably linked on the leading blade driving arm connecting pin 22a. Member 24 is the auxiliary spring for the leading blades as the urging means with spring, whereby the one end is rotatably engaged in the small hole in the leading blade connecting arm while the other end is engaged with the spring hanger 25. Member 26 is the rear blade driving arm, being secured on the tail blade driving shaft 20. Member 26a is the tail blade driving arm connecting pin, being secured on the tail blade driving arm 26. Member 27 is the tail or trailing blade connecting arm, being rotatably engaged with the tail blade driving arm connecting pin. Member 28 is the auxiliary spring for the tail blades as the urging means with spring, whereby the one end is rotatably engaged in the small hole in the rear blade connecting arm 27, while the other end is engaged with the spring hanger 25.

Figure 2B:
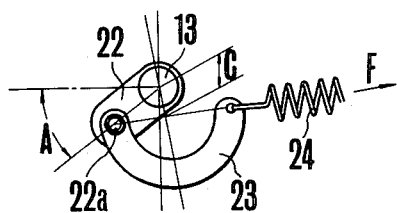
Figure 2C:
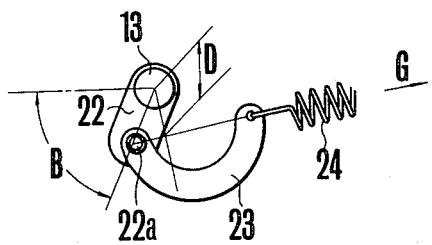

FIG. 2 shows the important part of the auxiliary spring for explaining the operation of the shutter shown in FIG. 1, whereby FIG. 2(a) shows the charged state of the shutter, FIG. 2(b) shows the running state and FIG. 2(c) represents the terminated state of the shutter running.

In the drawing, the relation between the rotation angles A and B and the moment by means of the spring 24 is shown. C and D represent the arm length lengths of the rotational moments.

In the state shown in FIG. 2(a), no rotational moment is produced. FIG. 2(b) shows the state in which the arm has rotated by the angle A, whereby the rotational moment is represented with $C \times F$ (F: Tension of the spring 24). FIG. 2(c) shows the state in which the arm has rotated by the angle B, whereby the rotation moment is represented with $D \times G$ (G: Tension of the spring 24).

In this way, the driving power by means of the spring 24 gradually goes up from 0 from the start of the rotation of the shaft B until the termination of the exposure.

Below, the operation of the embodiment will be explained in accordance with FIGS. 1 and 2.

Hereby, the mechanism of the leading blade driving system shown in FIG. 1 is the same as that of the tail blade driving system, so that the explanation is made in accordance with the leading driving system.

In the charged state of the shutter, as is shown in FIGS. 1 and 2, the leading blade driving arm connecting pin 22a, the leading blade driving shaft 13 and the spring hanger 25 lie on the same straight line. Consequently, no rotational moment is produced in the leading blade driving shaft 13 by means of the auxiliary spring 24. When in the above state a current is supplied to the leading blade driving coil 16 through the conductors 18 and 19 from the driving circuit, a force is produced in the part existing in the magnetic field of the coil. This force is along the direction perpendicular to that of the magnetic flux and the current is as explained by Fleming's Law. Further, this force acts upon the leading blade driving shaft 13 as a couple of moment, so that the leading blade driving coil 16 is urged along the direction of the arrow (counterclockwise direction) in the drawing in such a manner that the leading blade driving shaft 13 secured on the coil 16 is rotated, whereby the leading blade holding arm 4 is rotated along the counter-clockwise direction. Consequently, by means of a link mechanism the leading blades 1, 2 and 3 move upwards to the left in the drawing so as to start the exposure.

When in the above process, as is shown in FIG. 2(b), the leading blade shaft 13 has rotated by the angle A, the relation among the leading blade driving arm connecting pin 22a, the leading blade driving shaft 13 and the spring hanger 25 which have been on the same straight line changes in such a manner that as is shown in the drawing the length of the arm is increased up to C so that the rotational moment $C \times F$ is produced with the tension F of auxiliary spring 24 for the leading blades. Thus, at the time point at which the angle is A the force composed of the electromagnetic force and the rotational moment of the spring acts upon the leading blade driving shaft 13 so as to increase the driving force and consequently the speed of the blades.

At the time point at which as is shown in FIG. 2(c) the angle is B, the rotation moment is D×G because the length of the arm is D.

In the same way, upon the tail blade driving shaft 20 a force composed of the electromagnetic force and the rotation moment of the spring acts after the angle is a certain determined value in the same way as in case of the leading blade driving shaft 13.

Further, the shafts 13 and 20 are so designed that when they have rotated by 180° from the rotation starting phase the leading and the tail blades terminate the exposure running.

Figure 3:
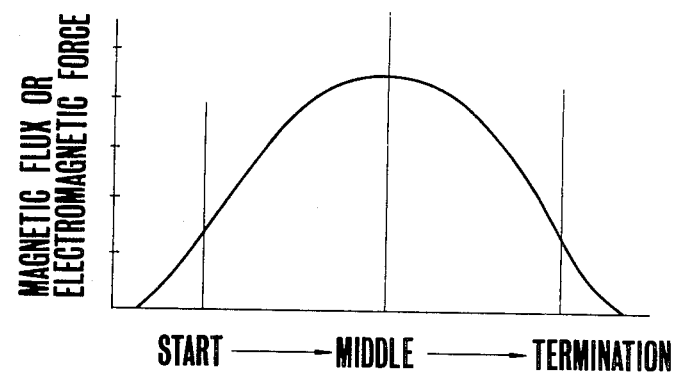
FIG. 3 shows the relation between the driving force of the electromagnetic driving source and the rotation position.
Figure 4:
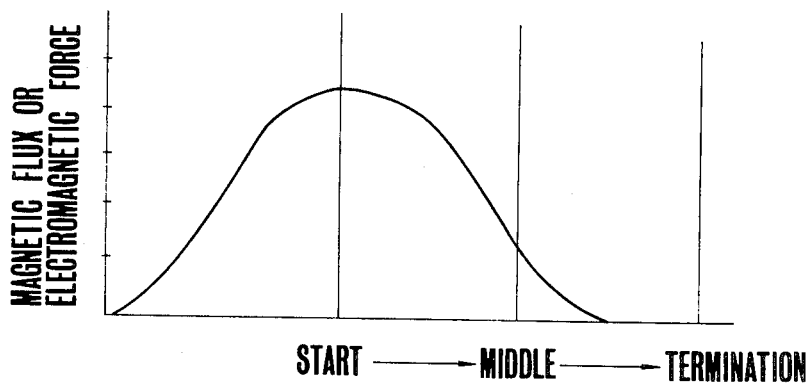
FIG. 4 shows the curve shown in FIG. 3, whereby the maximum position of the curve is displaced immediately after the start position.
Figure 5:
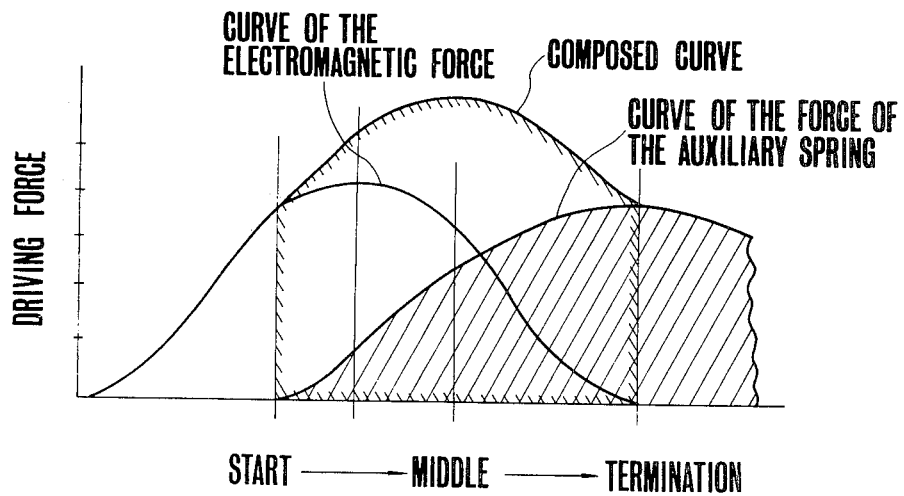
FIG. 5 shows the composite diagram of the electromagnetic driving force and the driving force of the auxiliary spring.

FIG. 3 shows the diagrams representing the distribution of the magnetic flux of the permanent magnetic and the rotation phase of the driving system, while FIG. 4 shows the diagram when the starting position of the driving system is taken at the position at which the density of the magnetic flux is maximum. FIG. 5 shows the distribution of the driving force with reference to the rotation phase of the driving shaft as the composed diagram of the curve of the electromagnetic force and that of the force of the auxiliary spring.

In case now the peak of the driving force of the electromagnetic driving source is positioned in the middle of the rotation phase of the leading blade driving shaft 13 as is shown in FIG. 3, the electromagnetic force is small at the starting position, whereby the starting force is so small that the shutter start is slow. In accordance with the present invention the anisotropic rare earth magnet is used as the permanent magnet, sufficient width of the effective magnetic flux cannot be taken as is shown in FIG. 3, so that the effective rotation angle becomes small, whereby especially at the time of the starting and the termination the driving force is small, which is inconvenient.

Further, in order to avoid the above inconvenience the starting position is taken at the position at which the electromagnetic force is maximum as is shown in FIG. 4, the starting force is maximum and the shutter starts well, while from the middle of the rotation position to the termination the electromagnetic force becomes small and the driving force becomes insufficient.

In the device in accordance with the present invention by using the auxiliary spring as is shown in FIG. 5 the distribution of the magnetic flux of the permanent magnet is arranged so that the peak of the electromagnetic force occurs immediately after the start of the shutter blades. Thus, the force of the auxiliary spring is added to the driving force after the density of the magnetic flux becomes small. Consequently, the widely stabilized stroke can be obtained so that the shutter can be controlled easily, which is profitable. Further, by properly combining the curve of the electromagnetic force with that of the torque of the auxiliary spring the running characteristics of the shutter blades can optionally be changed.

Figure 6:
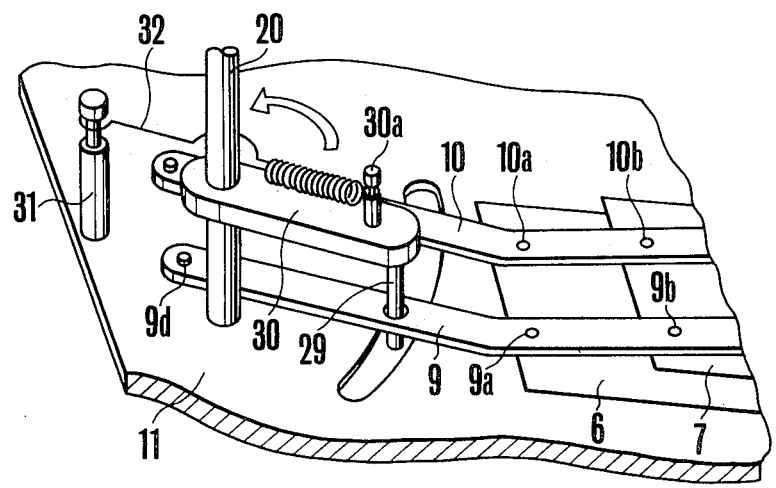
FIGS. 6 and 7 show the composition of the auxiliary urging spring means in other embodiments of the present invention.

FIG. 6 shows another embodiment of the present invention having an auxiliary spring, whereby only the tail blade system is shown because the leading blade system is the same as the tail blade system.

In the drawing, member 30 is the tail or trailing blade driving lever, being secured on the tail blade driving shaft 20. Member 29 is the tail blade driving pin provided on the tail blade driving lever 30. Element 30a is the spring hanger provided on the tail blade driving lever 30. Element 31 is the spring hanger provided on the shutter base plate 11. Member 32 is the auxiliary spring for the tail blades as the urging means with spring in accordance with the present invention, whereby one end is engaged with the spring hanger 30, while the other end is engaged with the spring hanger 31. Other members are same as those in FIG. 1, so that their explanation is omitted here.

Figure 7:
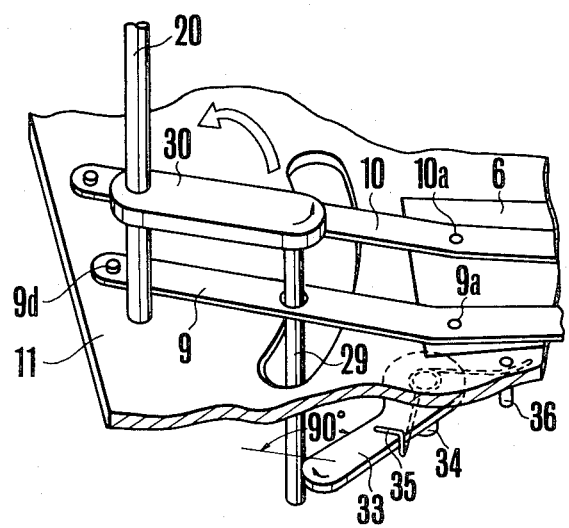

FIG. 7 shows further another embodiment of the present invention having an auxiliary spring, whereby only the tail blade system is shown because the leading blade system is the same as the tail blade system.

In the drawing, member 30 is the tail or trailing blade driving lever, being secured on the tail blade driving shaft 20. Member 29 is the tail blade driving pin, being secured on the tail blade driving lever 30. Member 33 is the auxiliary lever for the tail blades, being secured on the shutter base plate 11 rotatably linked on the auxiliary lever pin 34 for the tail blades. In the charged state the leading blade driving pin 29 of the tail blade driving lever 30 is in contact with the auxiliary lever 33 for the tail blades almost at the right angle.

Element 35 is the auxiliary spring for the tail blades as the urging means with the spring in accordance with the present invention. The one end is engaged with the auxiliary lever 33 for the tail blades, while the other end is engaged with the spring hanger 36.

Element 36 is the spring hanger, being secured on the shutter base plate 11. Other members are same as those in FIG. 1, so that their explanation is omitted here.

In case of the above embodiments the torque of the spring 32 or 35 increases from zero to the maximum, while the driving shaft rotates from zero to 180°, in the same way as the springs 24 and 28. Consequently, the operation is the same as that of the construction shown in FIG. 1.

As explained above, in the present invention a high-grid construction is designed so that by adding the auxiliary spring to the electromagnetic driving source the shortcomings of the electromagnetic driving source and that of the spring are compensated so as to contribute much to economy of the power, compactness and, stabilization and so on.

What is claimed is:

1. An electromagnetically driven shutter comprising:
   shutter blade means for controlling the opening and closing of a photographic optical path in accordance with displacement;
   a permanent magnet member, said member forming a magnetic field along a predetermined fixed direction;
   a movable conductor member, said member being arranged in the magnetic field of the permanent magnet so as to be displaced when a current runs through the member along a predetermined direction, while said member connected to the shutter blade means in such a manner that in accordance with the displacement of said member the shutter blade means open and close the photographic optical path; and
   urging spring means for applying an urging force to the movable conductor member along the direction along which the exposure operation of the shutter blade means is accelerated so that at the starting point of the exposure operation by means of the shutter blade means the driving force of said means is zero and gradually increases toward the termination of the exposure operation.

2. An electromagnetically driven shutter in accordance with claim 1, wherein the shutter blade means form a slit exposure shutter.

3. An electromagnetically driven shutter in accordance with claim 2, wherein the shutter blade means form a focal plane shutter consisting of at least one leading blade and one tail blade.

4. An electromagnetically driven shutter in accordance with claim 3, wherein the leading blade and the tail blade are respectively provided with a blade driving member, a permanent magnet member, a movable conductor member and an urging spring means, the leading blade and the tail blade being driven independently from each other.

5. An electromagnetically driven shutter in accordance with claim 1, wherein the permanent magnet being an anisotropic rare earth magnet.

6. An electromagnetically driven shutter in accordance with claim 5, wherein the density of the magnetic flux of the permanent manget are set so as to be maximum in the neighborhood of the displacement starting point of the movable conductor member.

7. An electromagnetically driven shutter in accordance with claim 1, wherein the torque of the urging spring means are set so as to be maximum at the termination of the exposure running of the shutter blades.

* * * * *